C. C. SPRINGER.
Ice-Cutting Machine.

No. 197,746. Patented Dec. 4, 1877.

Witnesses;
Grenville Lewis
M. Church

Inventor.
C. C. Springer
By Hill, Ellsworth & Spear
His Attys.

N. PETERS, PHOTO-LITHOGRAPHER, WASHINGTON, D. C.

UNITED STATES PATENT OFFICE.

CHARLES C. SPRINGER, OF YARMOUTH, MAINE.

IMPROVEMENT IN ICE-CUTTING MACHINES.

Specification forming part of Letters Patent No. 197,746, dated December 4, 1877; application filed January 15, 1877.

*To all whom it may concern:*

Be it known that I, CHARLES C. SPRINGER, of Yarmouth, in the county of Cumberland and State of Maine, have invented a new and Improved Ice-Cutting Machine; and I do hereby declare the following to be a full, clear, and exact description of the same, reference being had to the accompanying drawings, forming part of this specification.

My invention relates to machines for cutting ice on the surface of rivers or lakes, for the purpose of reducing it to blocks of proper size and shape for storage.

It is an improvement on that class of machines which are mounted on wheels adapted to be drawn over the surface of the ice, and which carry a saw or cutter, driven by suitable gearing connected to the drive-wheels.

The invention more particularly consists of certain improved details, which are hereinafter fully set forth, and which serve to make the machine operative for practical and successful use.

Figure 1:
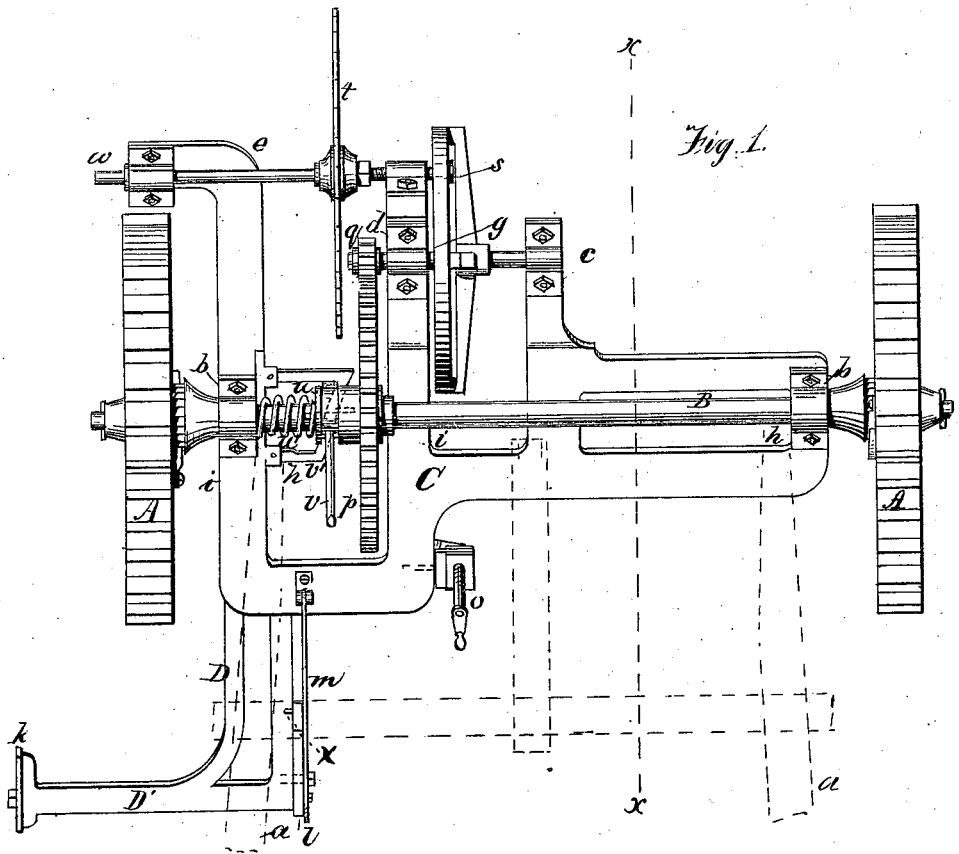
Figure 2:
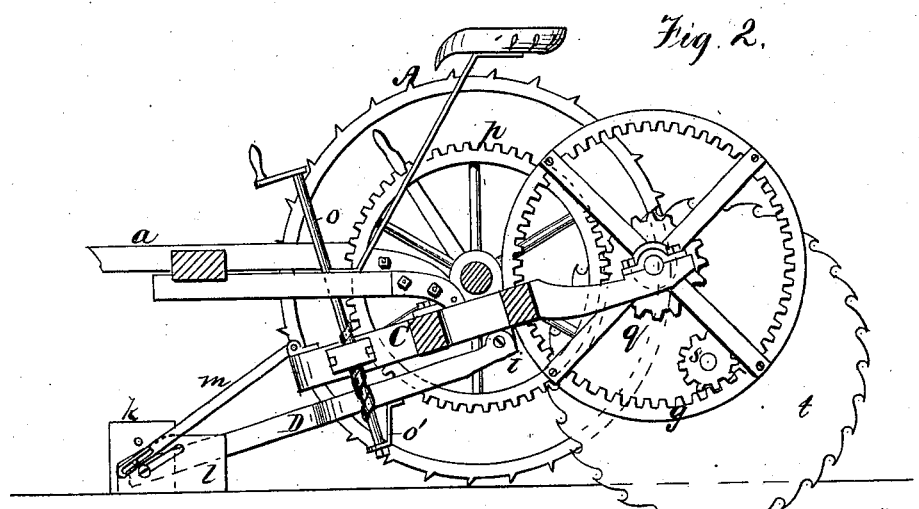

Figure 1 represents a plan view of the machine, and Fig. 2 a vertical longitudinal section thereof through line $x\ x$.

The machine represented is adapted to be drawn by a horse, attached to the machine by means of the shafts $a\ a$. The drive-wheels are represented at A A, and are connected to the axle B by means of pawls and ratchet, so as to permit free movement of the machine backward without rotation of the axle, but connecting the wheels with the axle, and causing its rotation in the forward movement of the machine. In bearings $b\ b$ is hung upon this axle a frame, C, which may be formed of a single piece of casting, and which serves as a support for the saw and the gearing which connects the saw with the pinion on the axle, as well as for the attachment of the guide and the shafts. This frame is formed, as shown, with rearward extensions $c$, $d$, and $e$, of which $c$ and $d$ serve as bearings for an interior gear-wheel $g$. The extension $d$ serves also, in connection with $e$, to support the arbor of the saw. The shafts are attached to the frame at the points $h\ h$, and a second frame, D, for the guide-arm is connected underneath at points $i\ i$, and is represented in Fig. 1, partly in dotted lines. This frame D is pivoted, as shown in Fig. 2, so as to have a vertical movement independent of the main frame of the machine. The lower and forward end of this frame is provided with a shoe, $l$, attached thereto by means of a set-screw passing through an inclined slot in the shoe. This slotted connection serves to render the shoe adjustable in height in relation to the forward end of the frame, so that the bar D′ may ride over the ice more or less elevated therefrom. A short pin, $x$, projecting from the shoe $l$, bears upon the top surface of the frame D, and serves to guide the shoe in its movements and prevent it from turning. A bar, $m$, pivoted to the frame C, and having a slotted connection with the shoe $l$, serves to raise and lower the shoe $l$ when the adjusting-shaft $o$ is operated, and thus elevate or depress the outer end of the frame D D′, carrying the guide $k$.

The bar D′ carries on its outer end a vertically-adjustable guide-plate, $k$, intended to move in the kerf cut by the prior passage of the machine, and so direct it that the blocks shall be of uniform width. When the machine is in operation, the shoe slides on the ice, with the guide-plate in the kerf. The frame of the machine is tipped in relation to the auxiliary frame, and is held as well as moved by means of a shaft, $o$, the lower end of which rests and turns in a step, $o'$, on the auxiliary frame D. The shaft is provided with a screw-thread, which works in a nut on the main frame C. The upper end of the shaft is placed in convenient position for the driver, and is provided with a crank, so that he may turn it at will.

The rotation of the shaft raises the forward end of the frame C, and depresses the rear, which carries the saw. By this the saw may be made to cut at any desired depth, or may be raised clear from the ice.

On the axle is placed a gear-wheel, $p$, fitted loosely, but held against lateral motion, on one side by a collar and on the other by a clutch, $u$. This clutch slides on the axle on a spline, and is pressed against the hub of the gear-wheel $p$ by means of a spring, $w'$, so as to be normally in gear with the said wheel. The clutch may be thrown back out of gear with the wheel $p$ by means of a lever, $v$, which embraces the clutch, and bears at its lower end against an inclined bar, $v'$. When this lever $v$ is drawn back, as it may be by the driver in his seat, the lower end slides against the inclined bar, and carries the clutch away from connection with the wheel. In this position the axle turns freely in the wheel, and no motion is communicated to the saw. Otherwise the wheel $p$ turns with the axle, and, through the train of gears $q$, $g$, and $s$, turns the saw, communicating thereto very rapid motion. A second saw may, if it be found desirable, be placed on the outer end of the arbor at $w$, in which case the guide $k$ would need to be extended more to the right of the machine.

The drive-wheels are provided with short ribs or studs, in order that they may take firm hold upon the ice and have force enough to drive the gearing and saw. A suitable seat for the driver is mounted on the frame, as shown in Fig. 2.

The whole main frame is so hung on the axle as to tip readily, to depress or elevate the saw, and the whole machine, by this construction, is made cheap and compact, and not liable to get out of order.

I claim as my invention—

1. The main frame C, hung upon the axle B, and carrying at its rear end, behind the axle, the saw $t$, and at its forward end, in front of the axle, the shoe $k$ and adjustable frame D, by which the saw is held in the ice the required depth, substantially as described.

2. The frame D, which carries the guide, pivoted underneath the main frame C, and connected therewith by the screw-shaft, as set forth.

3. The combination of the slotted shoe $l$ and slotted brace $m$ with the adjustable frame D and main frame C, substantially as described.

4. The hinged frame D, carrying the guide $k$ and its slotted plate $l$, adapted for adjustment, with respect to the main frame C, by means of the slotted brace $m$ and the screw-shaft $o$, substantially as described.

5. The combination of the shoe $l$, connected to the frame D by means of a set-screw, which passes through an inclined slot in said shoe and the slotted bar $m$, as set forth.

CHAS. C. SPRINGER.

Witnesses:
J. M. WINCHELL,
J. P. WINCHELL.